UNITED STATES PATENT OFFICE.

AUGUSTUS WOLSKEL, OF KEW, VICTORIA, AUSTRALIA.

PREPARING ASPHALT.

SPECIFICATION forming part of Letters Patent No. 697,307, dated April 8, 1902.

Application filed January 6, 1902. Serial No. 88,655. (No specimens.)

*To all whom it may concern:*

Be it known that I, AUGUSTUS WOLSKEL, a subject of the King of Great Britain, residing at Walpole street, Kew, in the county of Bourke, in the State of Victoria and Commonwealth of Australia, have invented Improvements in Preparing Asphalt, of which the following is a specification.

The durability of an asphalt depends largely upon the perfect adhesion between the surfaces of the various particles of sand or grit and the bitumen with which they are coated. By "sand" or "grit" I mean grains or particles of silicious or like matter having different or uniform degrees of coarseness or fineness. I have found by experiment that the most effective way to produce such adhesion is to roast the sand or grit at a temperature sufficient to raise the sand or grit to a clear red heat, such temperature being not substantially less than 800° Fahrenheit, but preferably higher, so as to effect and bring about the complete incineration of all organic matter present on the surfaces of the particles of sand or grit and to render innocuous the small quantities of iron, soluble silica, and like matter which are commonly present in the original sand or grit, thus producing a more thoroughly clean material than is obtained by the ordinary method of washing the sand or grit with water.

The type of furnace used to effect the roasting is unimportant, providing it be capable of raising the sand or grit to a clear red heat. I wish it to be understood that the roasting of the sand or grit above referred to is independent and apart from any of the present processes in use of washing, grinding, dressing, or warming to substantially less than 800° Fahrenheit or any like operation such as sand or grit is frequently submitted to previous to incorporation with bitumen for the preparation of asphalt, and also that after roasting the sand or grit may be cooled by any known method. To clearly illustrate the use of such roasted sand or grit, I hereunder shortly describe a process of preparing asphalt; but other than as specified in my claiming clause I disclaim such process as part of my now-declared invention, and it is understood that such under-mentioned process may be varied according to circumstances.

The sand or grit taken from the sand-pits or produced artificially by crushing silicious matter, is roasted, with constant stirring, in a reverberatory furnace, using a heat for doing so of 800° Fahrenheit or more, until all organic matter is destroyed, excepting, perhaps, unimportant traces. It is then cooled to its normal temperature. The sand or grit after being so treated is warmed to 350° Fahrenheit, and to every one hundred pounds weight of sand so warmed there is added thirty-three pounds weight (or thereabout) of melted bitumen or asphaltum. These two ingredients are then mixed by any convenient method until each particle of sand or grit is completely coated with bitumen. The resultant asphalt is then gradually removed from the mixing vessel and spread or placed *in situ* by means of hand-floats or other equivalent appliances.

Having now particularly described and ascertained the nature of my said invention and in what manner the same is to be performed, I declare that what I claim is—

In the preparation of asphalt, roasting sand grit or particles of silicious or like matter at not substantially less than 800° Fahrenheit, cooling the mass to its normal temperature, then reheating to about 350° Fahrenheit, and mixing therewith melted bitumen or asphaltum until each particle is completely coated, substantially as described.

In testimony whereof I have hereunto set my hand in presence of two subscribing witnesses.

AUGUSTUS WOLSKEL.

Witnesses:
   EDWARD WATERS,
   EDWARD WATERS, Jr.